(12) United States Patent
Campbell (10) Patent No.: US 9,398,285 B2
(45) Date of Patent: Jul. 19, 2016

(54) METHODS AND APPARATUS FOR PRODUCING AND CAPTURING THREE DIMENSIONAL IMAGES

(76) Inventor: Scott Andrew Campbell, Kingston (CA)

( * ) Notice: Subject to any disclaimer, the term of this patent is extended or adjusted under 35 U.S.C. 154(b) by 186 days.

(21) Appl. No.: 14/115,573

(22) PCT Filed: May 4, 2011

(86) PCT No.: PCT/CA2011/000515
§ 371 (c)(1),
(2), (4) Date: Nov. 4, 2013

(87) PCT Pub. No.: WO2012/149623
PCT Pub. Date: Nov. 8, 2012

(65) Prior Publication Data
US 2014/0071246 A1    Mar. 13, 2014

(51) Int. Cl.
*H04N 13/02*      (2006.01)
*G02B 27/22*      (2006.01)
*H04N 13/04*      (2006.01)
*H04N 5/64*       (2006.01)

(52) U.S. Cl.
CPC ........ *H04N 13/0239* (2013.01); *G02B 27/2214* (2013.01); *H04N 13/0225* (2013.01); *H04N 13/0228* (2013.01); *H04N 13/0404* (2013.01); *H04N 13/0409* (2013.01); *H04N 5/64* (2013.01)

(58) Field of Classification Search
CPC .......... H04N 13/0239; H04N 13/0225; H04N 13/0228; H04N 13/0404; H04N 13/0409; H04N 5/64; G02B 27/2214
See application file for complete search history.

(56) References Cited

U.S. PATENT DOCUMENTS

| | | | |
|---|---|---|---|
| 4,526,439 A | 7/1985 | Okoshi et al. | |
| 5,671,992 A | 9/1997 | Richards | |
| 6,543,899 B2 | 4/2003 | Covannon et al. | |
| 2003/0086167 A1* | 5/2003 | Sonehara | G02B 27/2214 359/471 |
| 2009/0168167 A1* | 7/2009 | Hiroya | G02B 27/2214 359/477 |
| 2010/0014053 A1 | 1/2010 | Brentnall, III et al. | |
| 2011/0018971 A1* | 1/2011 | Hasegawa | H04N 5/2251 348/47 |

(Continued)

FOREIGN PATENT DOCUMENTS

| CA | 2518595 A1 | 10/2004 |
|---|---|---|
| WO | WO 2010/107247 A2 | 9/2010 |

(Continued)

*Primary Examiner* — Tat Chio
(74) *Attorney, Agent, or Firm* — Muncy, Geissler, Olds & Lowe, P.C.

(57) ABSTRACT

A method and device for producing and capturing three dimensional ("3D") images by utilizing a matrix of reflex micro lens assemblies ("3DRML") is provided. Each comprises a housing having a base structure, lateral walls surrounding the base structure, an open end defined by the walls, flex mirror assembly at the base structure and dual diode (or photodiodes ("PDs") for capturing) projecting assembly. The projecting assembly has a parallax barrier extending from about the center of the mirror assembly and dividing it into two portions, and at least two light emitting diodes ("LEDs") (or PD) affixed to the barrier away from the mirror assembly. LEDs project light to the mirror assembly (or PDs receive lights therefrom). Two lens assemblies at the open end correct and redirect the directions of light rays. PD (or LED), facing directly to the open end, may be added to capture (or produce) two dimensional images.

8 Claims, 12 Drawing Sheets

(56) References Cited

U.S. PATENT DOCUMENTS

2011/0310098 A1  12/2011  Kimoto et al.
2012/0008054 A1  1/2012   Kwon et al.
2012/0026418 A1  2/2012   Tsuchida
2012/0033048 A1  2/2012   Ogawa et al.
2012/0057229 A1  3/2012   Kikuchi et al.

FOREIGN PATENT DOCUMENTS

| | | |
|---|---|---|
| WO | WO 2010/116614 A1 | 10/2010 |
| WO | WO 2010/119592 A1 | 10/2010 |
| WO | WO 2010/121945 A2 | 10/2010 |
| WO | WO 2010/122690 A1 | 10/2010 |
| WO | WO 2010/122711 A1 | 10/2010 |

* cited by examiner

Figure 1

PRIOR ART

Figure 2

PRIOR ART

Figure 3

PRIOR ART

PRIOR ART

METHODS AND APPARATUS FOR PRODUCING AND CAPTURING THREE DIMENSIONAL IMAGES

CROSS-REFERENCE TO RELATED APPLICATIONS

This application is a national stage of International Application No. PCT/CA2011/000515, which was filed on May 4, 2011, and which is incorporated herein by reference.

STATEMENT REGARDING FEDERALLY SPONSORED RESEARCH OR DEVELOPMENT

N/A

NAMES OF THE PARTIES TO A JOINT RESEARCH AGREEMENT

N/A

REFERENCE TO A "SEQUENCE LISTING"

N/A

BACKGROUND OF THE INVENTION

1. Field of the Invention

The present invention relates to a three dimensional ("3D") imaging device and a method thereof either receptive or projective in nature without requirement for an adaptive eye ware.

The present invention further relates to a method to create two independent light rays to be projected or recorded through the same lens assembly for capturing or generating 3D images.

2. Description of Related Art

Televisions have evolved using a series of refinements over the decades. However, throughout these advancements, the fundamental principals have remained mainly unaltered, from the very first black and white TV, where only information pertaining to luminosity was sent to a specific pixel, to color TV where the only difference made was the addition of a color sub carrier to the old technology. When TV's transition to HD technology the resolution increased but the technology behind the TV remained the same.

The next evolution in the TV viewing experience, 3D images, brings a whole new methodology of viewing but is still based on the same TV technology as before. Many believe that the 3D TV today uses a completely new internal technology. In reality, it utilizes only a modification of the previous TV technologies.

3D images are created by replicating how the human eyes see, allowing for our sense of depth and perception of space. To create a 3D image, it requires two cameras, they must record an image simultaneously from different angles, mimicking how the human eyes see. Both images are then projected by the same source in unison. However, this does not fully create a 3D image but only an image that will appear blurry to the viewer. The images then need to be filtered so that the image recorded by the right vantage point is only seen by the right eye and vice versa for the left. This can be done in a number of ways. Chromatic filtration was the first method and used red and cyan lenses in the glasses. This worked however resulted in an undesirable coloration in the resulting image. Newer technology has emerged using polarized light allowing for images to be viewed with unaltered and vibrant colors.

There are, in general, three (3) types of 3D TV's in either commercial distribution or in a research stage. These utilize Active, Passive and/or Parallax technology.

Active 3D technology uses Electronic Shutter Glasses to produce a 3D image. The TV will show 120 images per second, 60 images for the right eye and 60 for the left. The glasses synchronize with the TV by using an infrared or Bluetooth signals. The signal generated from the TV controls the activation of liquid crystal in the optics of the glasses. When an electrical current passes through the optics, the liquid crystal causes the optic to go opaque blocking out the image. The glasses alternate the optical element in sync with the TV. This allows only the image meant to be seen by a particular eye to be seen at any given time. As this happens faster than the human eye can detect, the illusion that there is a constant 3D image is created.

Figure 1:
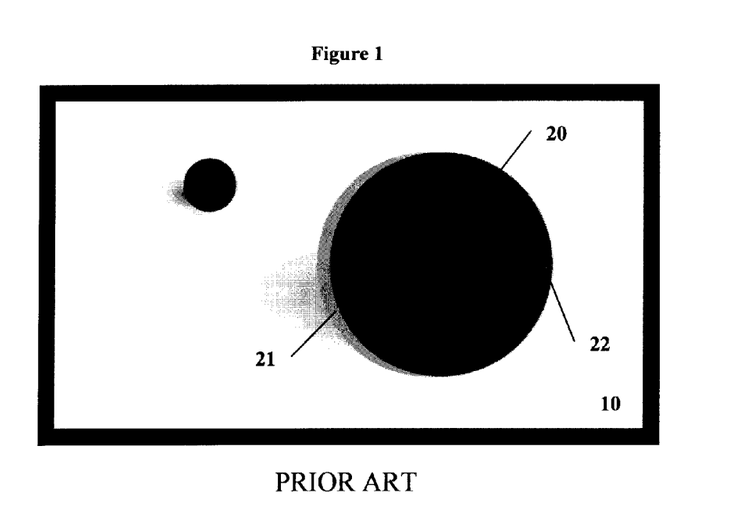
FIG. 1 illustrates a prior art anaglyph method for creating a three-dimensional image on a two-dimensional display.
Figure 2:
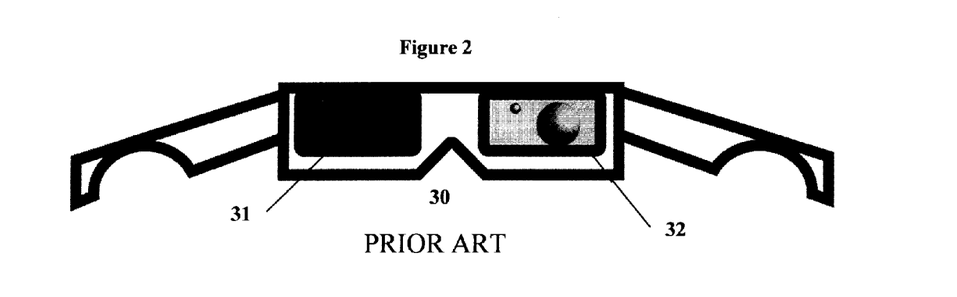
FIG. 2 illustrates a prior art eye glasses uses for viewing a three-dimensional image.

Referring to FIGS. 1 and 2, passive 3D technology uses polarization of light. This is a much more sophisticated form of anaglyph technology, the method used for decades using multicolored glasses, typically a red-cyan combination. Passive 3D is what is used in the commercial movie theaters, primarily with the use of inexpensive eye glasses. Passive TV's work by having every other pixel polarized in the opposite direction. Image information meant for the left eye 21 is polarized in the opposite direction as the right 22. The glasses 30 are then polarized to correspond with the polarization angles from the TV's, which are typically at 45 degrees for the left eye 31 and 135 degrees for the right eye 32. As the lens optic on the glasses only allows for light with the same polarization angle to pass through the correct image is delivered to the corresponding eye.

Figure 3:
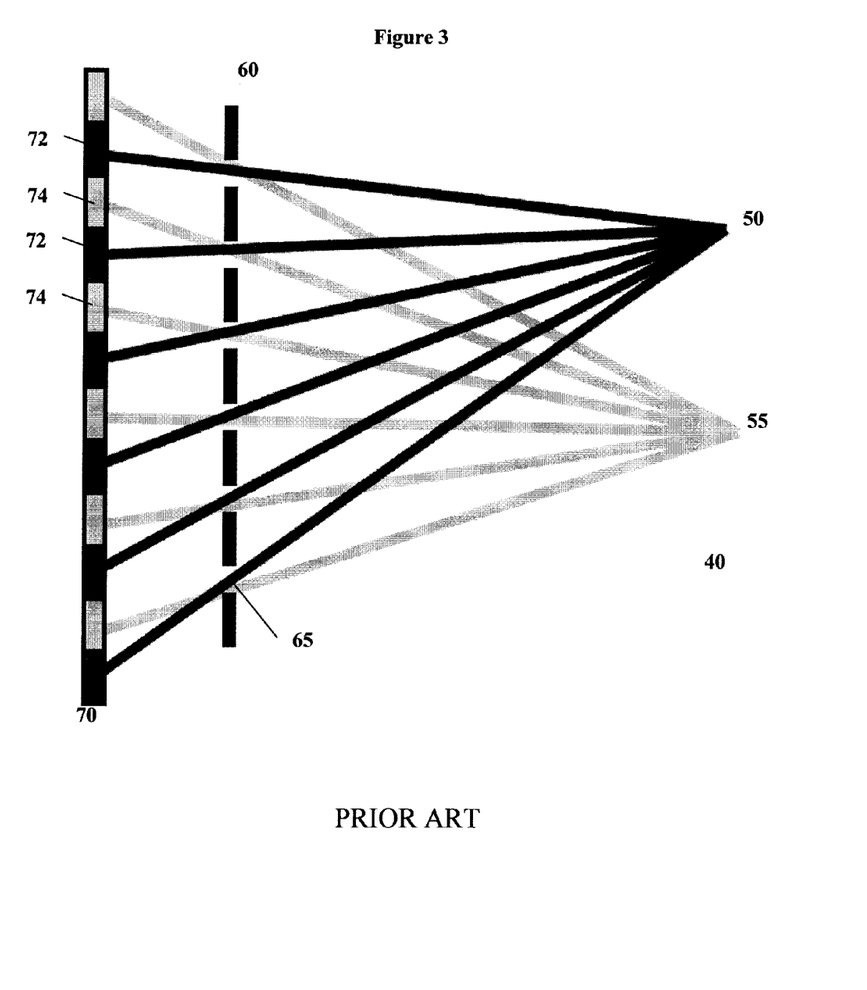
FIG. 3 illustrates a prior art three-dimensional image display apparatus using a parallax barrier.

Another form of 3D displaying device utilizes Parallax Barriers 40 as shown in FIG. 3. Parallax Barriers 40 allow for 3D viewing without glasses by using a barrier film 60 matched to the pixel pitch of the screen 70, providing the illusion of 3D. Every other pixel on the screen 70 will show an image for the corresponding eyes 50 and 55. Parallax barriers 40 rely on restricting light to travel in one direction crossing through the barrier 60 and then to the human eyes 50 and 55. However good this may sound the technology is limited to one, and only one viewing angle or position. Therefore, this is very restrictive for viewing.

These three technologies all rely on reusing existing TV technology.

For example, Canadian Patent Application No. 2,518,595 by Uwe et al., published on Oct. 21, 2004, teaches an apparatus and method for the conversion of a standard two dimensional screen into a 3D auto stereoscopic display. However, the application of the 3D optical assembly requires the disassembly of the front bezel and modification of the existing screen to install the 3D conversion assembly. Furthermore not all existing two dimensional screens are suitable for conversion. Precision alignment and signal processing are also required to provide a signal providing 3D imagery.

PCT International Patent Application Publication No. WO2010122711 by Ogawa et al., published Oct. 28, 2010, teaches the play back of 3D images using 3D image playback apparatus. The apparatus consists of a signal transmitter and a receiver built in to the Active Shutter of the glasses to control the synchronization between the TV and the viewing apparatus. These proprietary glasses are referred to as Active Shutter Glasses or an Active 3D system. However, such specialized TVs require proprietary viewing glasses that are costly.

PCT International Patent Application Publication No. WO 2010107247 by Seo et al., published Sep. 23, 2010, teaches a polarized filtration of a Liquid Crystal Display (LCD) using a passive 3D technology. This application of 3D imaging comprises of the application of the standard TV display panel with the addition of a polarized filter panel that is built into the screen, thus relying on polarized glasses for viewing. However, precision assembly of the screen is required for a high quality and consistent imagery between all screens assembled using this technology. Unlike active 3D technology, this allows for the use of inexpensive glasses to be used to create a stereoscopic image at all viewing angles; however the use of glasses restricts ease of use, comfort and convenience for multiple viewers.

PCT International Patent Application Publication No. WO 2010/119592 by Tsuchida, published Oct. 21, 2010, teaches the creation of a 3D stereoscopic display requiring no adaptive technology to be able to view the stereoscopic 3D image by implementing a parallax barrier. While this device allows for stereoscopy to occur without specialized viewing equipment, it is limited to direct viewing from a single vantage point. Viewing at various angles other than the optimized viewing angle and distance from the screen will result in the loss of 3 D viewing.

PCT International Patent Application Publication No. WO 2010/122690 by Kikuchi et al., published on Oct. 28, 2010, merely teaches enhanced brightness of a parallax barrier for both 2D and 3D displays.

PCT International Patent Application Publication No. WO 2010/121945 by Akhriev et al., published on Oct. 28, 2010 discloses the use of face tracking to render a 3D image based on the subject's vantage point. While this would overcome the limitation of restricted viewing angles by tracking the subject's movement but does not address the issue of displaying 3D images to multiple viewers.

PCT International Patent Application Publication No. WO 2010/116614 by Kimoto et al., published Oct. 14, 2010 discloses a device used in the generation of a 3D image. While it relates to the processing of an image, it does not disclose any device or method of creating 3D images that can be viewed on the disclosed device.

The aforementioned existing technologies are limited in their applications. The adaptations of existing technologies, as listed above, would result in an impractical and non-viable product for both consumer and commercial markets. Therefore, there is a need to improve at least one of these issues listed above.

BRIEF SUMMARY OF THE INVENTION

The present invention relates to a device for creating 3D images either receptive or projective in nature.

The present invention would address one or more of the aforementioned shortcomings/issues of competing technologies, and resulting in a viewing experience that is easier and more enjoyable for users. It further provides a solution for creating 3D images that is simple and practical to use.

The invention would further allow for multiple users to be able to view an image simultaneously from various angles in 3D without needing to use proprietary viewing apparatuses such as glasses to create the 3D effect.

An object of the present invention is to provide methods and apparatus for producing and capturing three-dimensional images.

Another object of the present invention is to provide an apparatus for capturing a three dimensional image.

A yet other object of the present invention is to provide an apparatus for displaying a three dimensional image.

A further object of the present invention is to provide an apparatus for capturing a three dimensional image while displaying a two dimensional image.

A yet further object of the present invention is to provide an apparatus for capturing a three dimensional image while displaying a two dimensional image.

BRIEF DESCRIPTION OF THE SEVERAL VIEWS OF THE DRAWING

The present invention is now described in more detail with reference to the accompanying drawings, in which.

DETAILED DESCRIPTION OF THE INVENTION

The present invention relates to a three dimensional ("3D") imaging device and method thereof either receptive or projective in nature without requirement for adaptive eye ware. The device and method are designed specifically for 3D imaging without adapting existing technology to achieve a 3D effect. With the redevelopment of how a 3D image is recorded, new streamlined and efficient ways of capturing 3D are proposed. By reverse engineering the process of capturing an image in 3D the projection of an image in 3D will be reproduced without adaptive eye ware.

The present invention further relates to a device and method to create two independent light rays to be projected or recorded through the same lens assembly.

Figure 4:
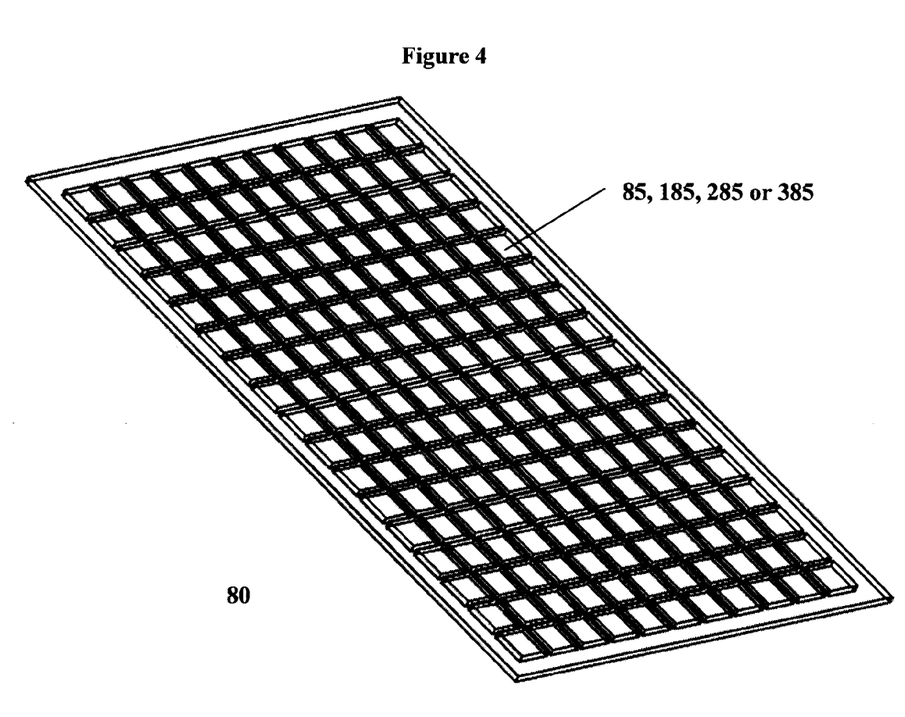
FIG. 4 illustrates a screen comprising a matrix or array of projective, receptive or compound three-dimensional reflex micro lens assemblies of the present invention.

FIG. 4 shows a screen 80, comprising an array or matrix of 3D reflex micro lens (or "3D-RML") assemblies either for projective (as for 3D display) 85, for sensor 185 (as for 3D camera) or for both projective and sensor 285 or 385.

Figure 5:
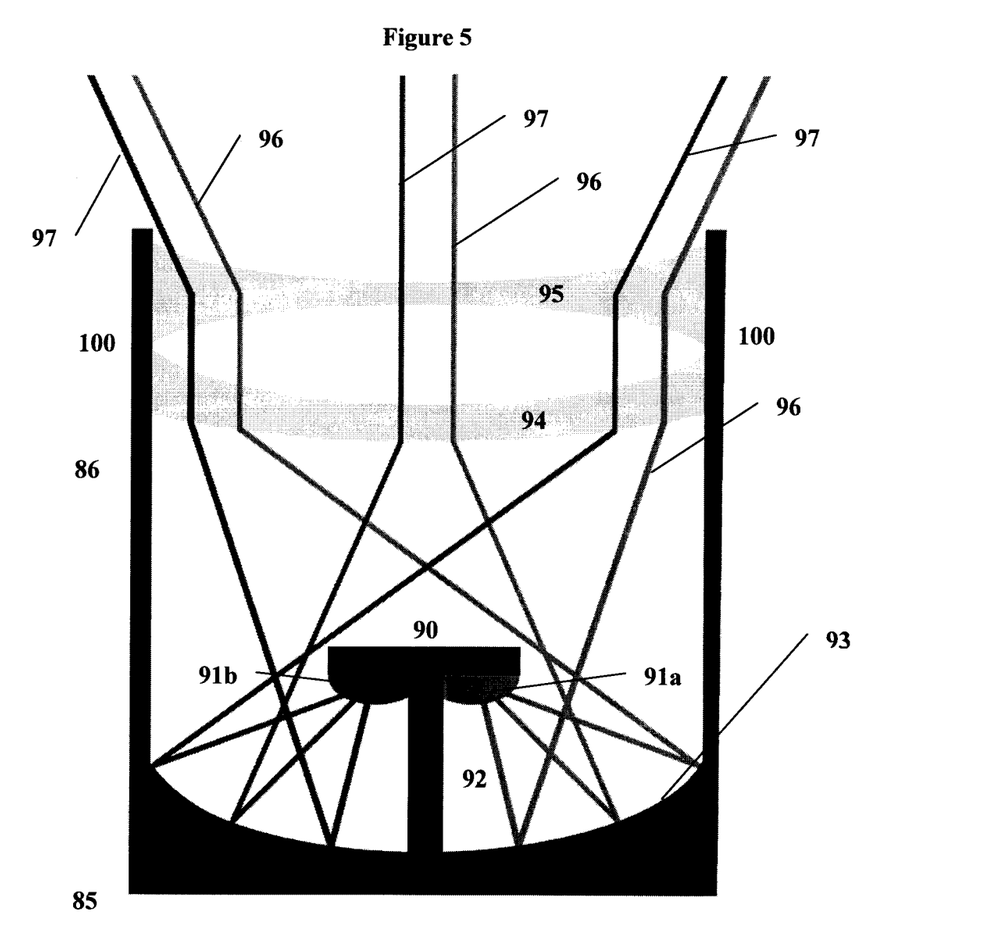
FIGS. 5 and 6 illustrate a projective three-dimensional reflex micro lens assembly of the present invention.
Figure 6:
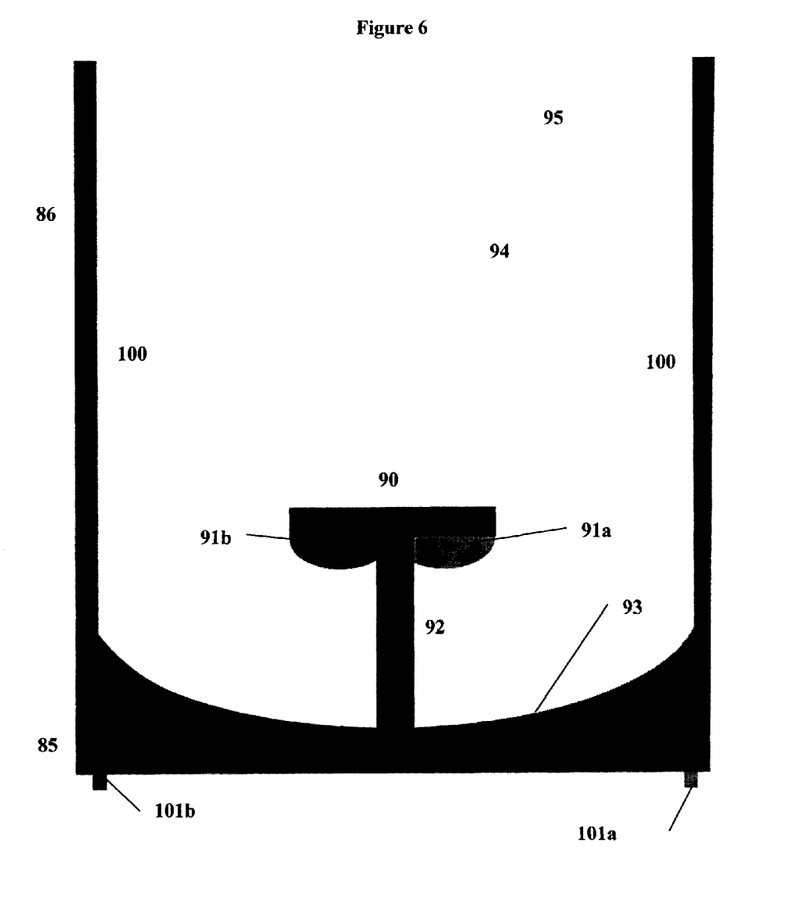

Referring to FIGS. 5 and 6, a projective 3D reflex micro lens assembly 85 comprises an optical or dual diode projection assembly 90 in a housing 86. The housing 86 has a flex mirror assembly 93 as its base structure, with lateral walls 100 surrounding the flex mirror assembly, and an open end having one or more lenses, i.e. 94 and 95. The flex mirror assembly 93 is generally concave in shape for reflecting light emitted from the dual diode projection assembly 90. The dual diode projection assembly 90 comprises a parallax barrier 92, one end of the parallax barrier 92 is affixed to and divides the reflex mirror assembly 93 into two portions. The parallax barrier 92 extends away from the reflex mirror assembly 93, preferably from about the bottom of the concave or center of the concave surface. At least two diodes, a right eye diode 91a and left eye diode 91b are attached to the other end of the parallax barrier 92 with a sufficient distance from the reflex mirror assembly 93. Each of these right 91a and left eye diode 91b projects an image onto the reflex mirror assembly 93, and destined to a particular eye of a viewer(s) (not shown). For example, the right eye diode 91a projects images onto the reflex mirror assembly 93 for the right eye(s) of the viewer(s). Likewise, the left eye diode 91b projects images onto the reflex mirror assembly 93, destined for the left eye(s) of the viewer(s).

The parallax barrier 92 works as a block for preventing undesired light from proceeding at any angles. For example, the light that is emitted from the right eye diode 91a would not enter into the direction or angles that would overlap with the left eye diode 91b and vice versa.

In the preferred embodiment of the present invention, the projective 3D reflex micro lens assembly 85 comprises two sets of lenses, including the first lens assembly 94 and secondary lens assembly 95. The first lens assembly 94 may comprise of one or more lenses and would function as to correct the right light channels 96, the images of which are emitted from the right eye diode 91a reflected on the reflex mirror assembly 93, and the left light channels 97, the images of which are emitted from the left eye diode 91b reflected on the reflex mirror assembly 93, and allowing the right light channels 96 and left light channels 97 to proceed to the secondary lens assembly 95 as parallel sets of light channels.

The secondary lens assembly 95 may comprise one or more lenses and would redirect each sets of right 96 and left light channels 97 to a different direction and creates a slight divergence in the parallel sets of light channels, such that, when the light reaches the viewer's eyes, the channels have separated sufficiently for the viewers to see the images as in three-dimensional images. In other words, light rays are projected at a slight angle of divergence so that each eye sees a slightly different projected image, and that these two tandem light rays are repeated at multiple angles such that multiple viewing positions are possible.

Each projective 3D reflex micro lens assembly 85 represents a pixel in a 3D display, and is capable of projected at multiple angles since the reflex mirror assembly 93 is concaved/curved to provide a capability to reflect light in multiple directions. Light rays reflects at the entire radius of the curvature of the reflex mirror assembly 93, and then out through the first and second lens assemblies 94 and 95 in multiple directions. This further allows for multiple viewing directions. In other words, each pixel or projective 3D reflex micro lens assembly 85 is capable of creating a 3D image without adaptive eye ware. In another preferred embodiment of the present invention, diffractive optics (not shown) may be used for this purpose in order to minimize the structural constraints or size.

Each of the light rays (emitted from the right 91a and left eye diode 91b) are projected at a slight different angle of divergence so that each eye sees a slightly different projected image, and that these two tandem light rays are repeated at multiple angles such that multiple viewing positions are possible.

Figure 7:
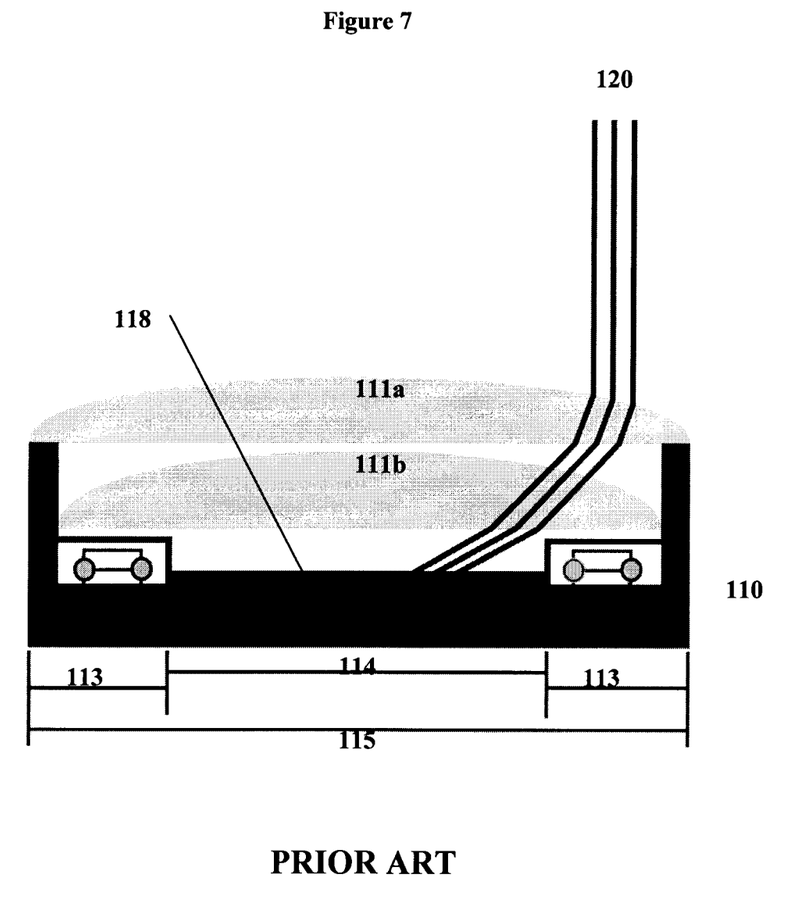
FIG. 7 illustrates a prior art CCD or CMOS based pixel for image sensing.

Reference is made to FIG. 7, a conventional CCD or CMOS pixel 110 comprises CCD or CMOS (respectively) photodiode 118 with the width of the pixel 115. A region 114 is light sensitive area and regions around it 113 are electric circuit, i.e. vertical register, etc. The pixel 110 comprises one or more micro-lenses 111a and 111b (typically upwardly convex lens(es)) for redirecting (or focusing) light rays 120 toward the photodiode 118. However, such structure is not suited for capturing three-dimensional images.

Figure 8:
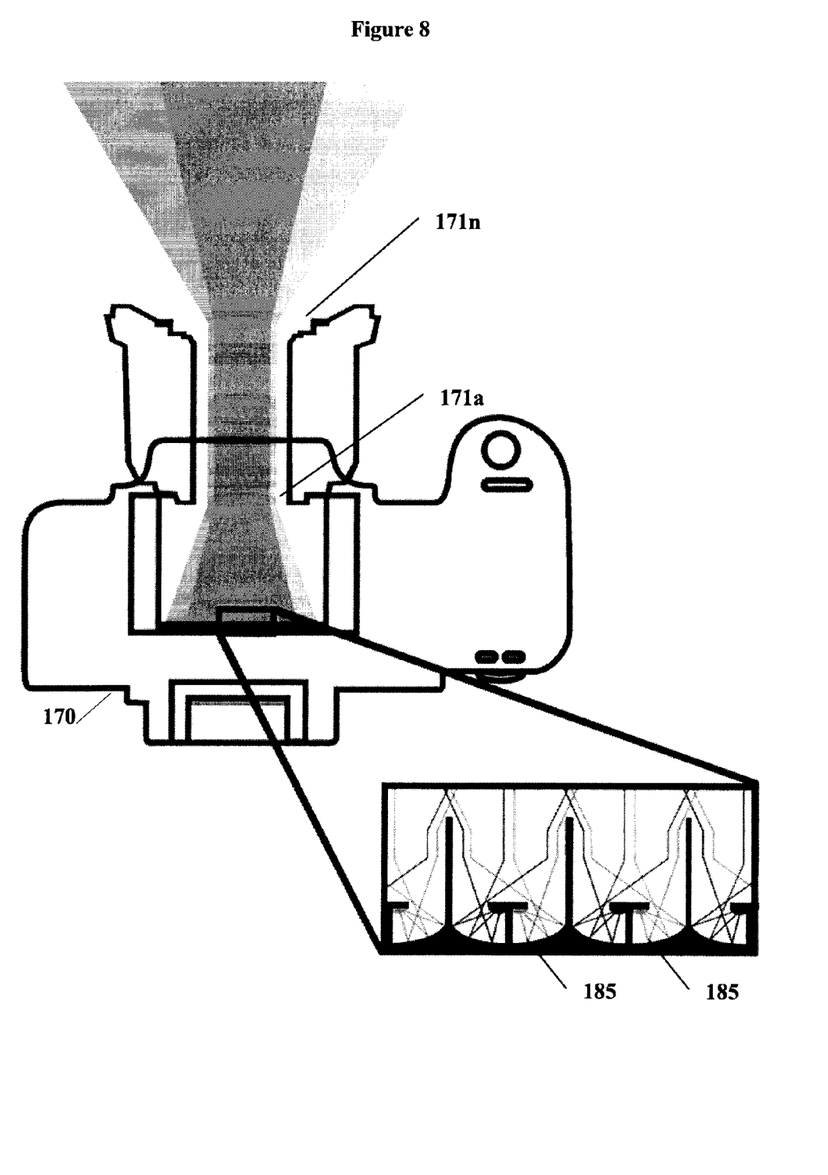
FIGS. 8 and 9 illustrate a receptive three-dimensional reflex micro lens assembly of the present invention.

FIG. 8 shows another embodiment of the present invention for capturing three-dimensional images. A three-dimensional camera 170 comprises one or more lenses 170a to 170n for correcting directions of light rays coming into the camera 170, and a matrix of receptive three-dimensional reflex mirror lens (3D-RML) assemblies 185 for sensing incoming direction corrected light rays for recording. Again, each receptive 3D-RML assembly 185 represents a pixel in a 3-D image.

Figure 9:
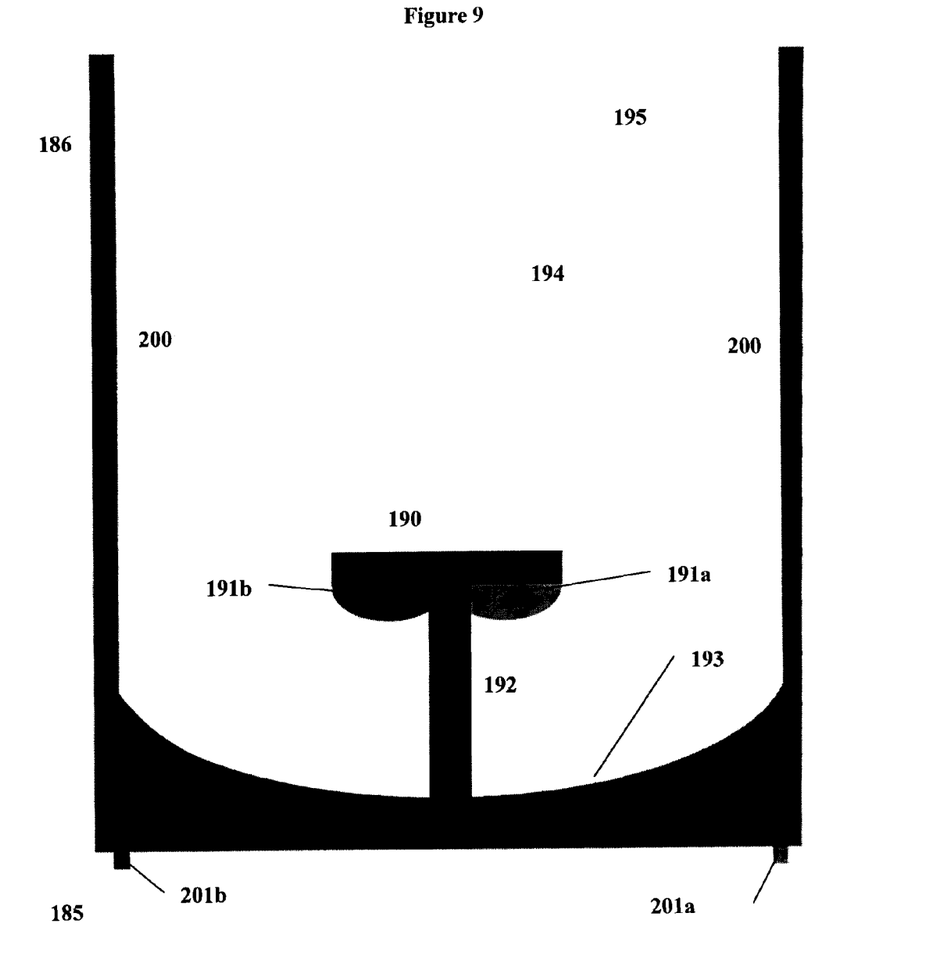

In the preferred embodiment of the present invention, each pixel or receptive 3D-RML assembly 185 consists of a housing 186 having a lateral wall 200 surrounding a reflex mirror assembly 193 as its base structure (of the housing 186) at the one end of the housing 186, a dual photodiode reception assembly 190 being situated at the bottom or center of the reflex mirror assembly 193, and at least two photodiodes, namely right eye photodiode 191a and left eye photodiode 191b in the dual photodiode reception assembly 190 with a sufficient distance from the reflex mirror assembly 193 as shown in FIG. 9. A parallax barrier 192, which is a part of the dual photodiode reception assembly 190, divides the reflex mirror assembly 193 into two portions and prevents incoming light rays from being detected incorrectly by the wrong photodiodes. Directions of incoming light rays are corrected by one or more lenses, i.e. 194 and 195. In the preferred embodiment of the present invention, first 194 and secondary lens assembly 195 are used to redirect incoming light rays, and corrected light rays are reflected on the flex mirror assembly 193, which in turn detected by the right 191a or left eye photodiode 191b. Each pixel or receptive 3D-RML assembly 185 provides a right 201a and left eye photodiode circuitry connection 201b and allows connections to a recording device (not shown) for the recording of 3D images. Multiple receptive 3D-RML assemblies may be arranged into a matrix of a predetermined size to produce a sensor of a preferred or given resolution. When the matrix is installed into a camera, each receptive 3D-RML assembly 185 may only use a single lens (instead of two as shown in FIG. 9) or more than two lenses. In the case that the receptive 3D-RML assembly 185 uses a single lens, existing or already established lens structures for cameras may be used.

Figure 12:
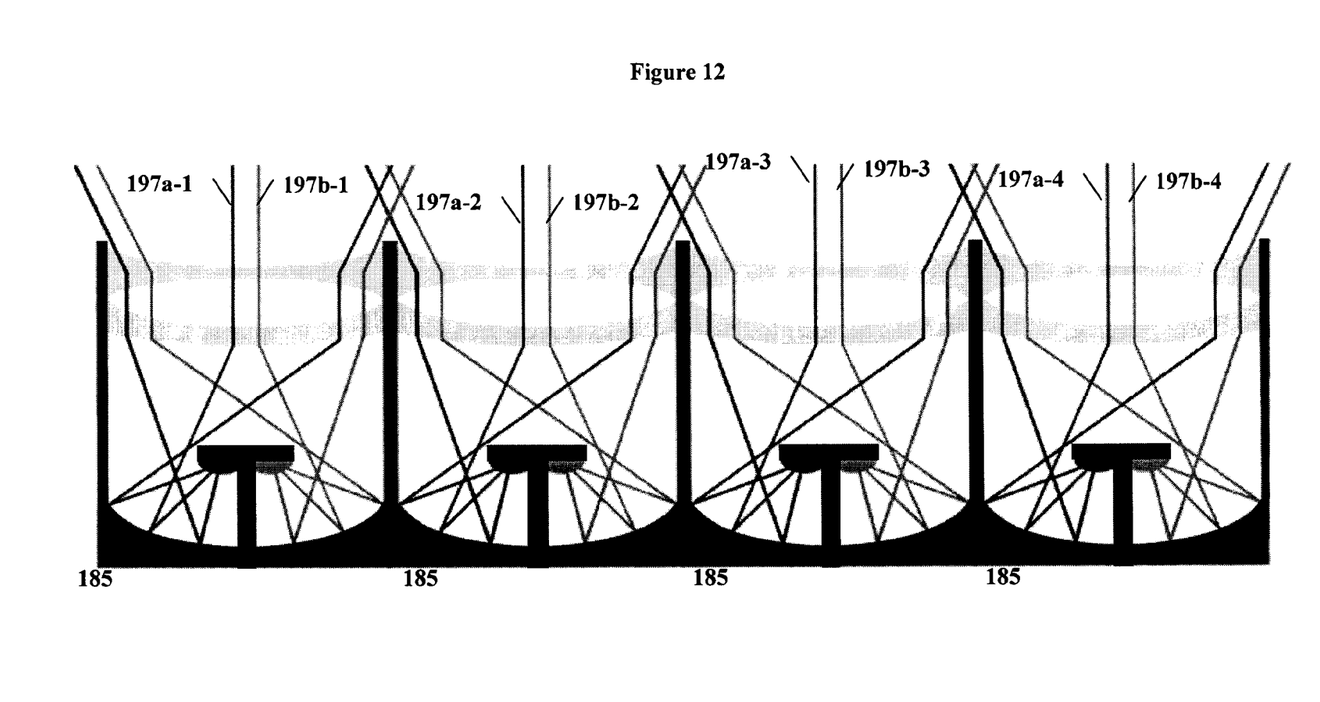
FIGS. 12 and 13 illustrate side section views of three-dimensional reflex micro lens assembly of the present invention.
Figure 13:
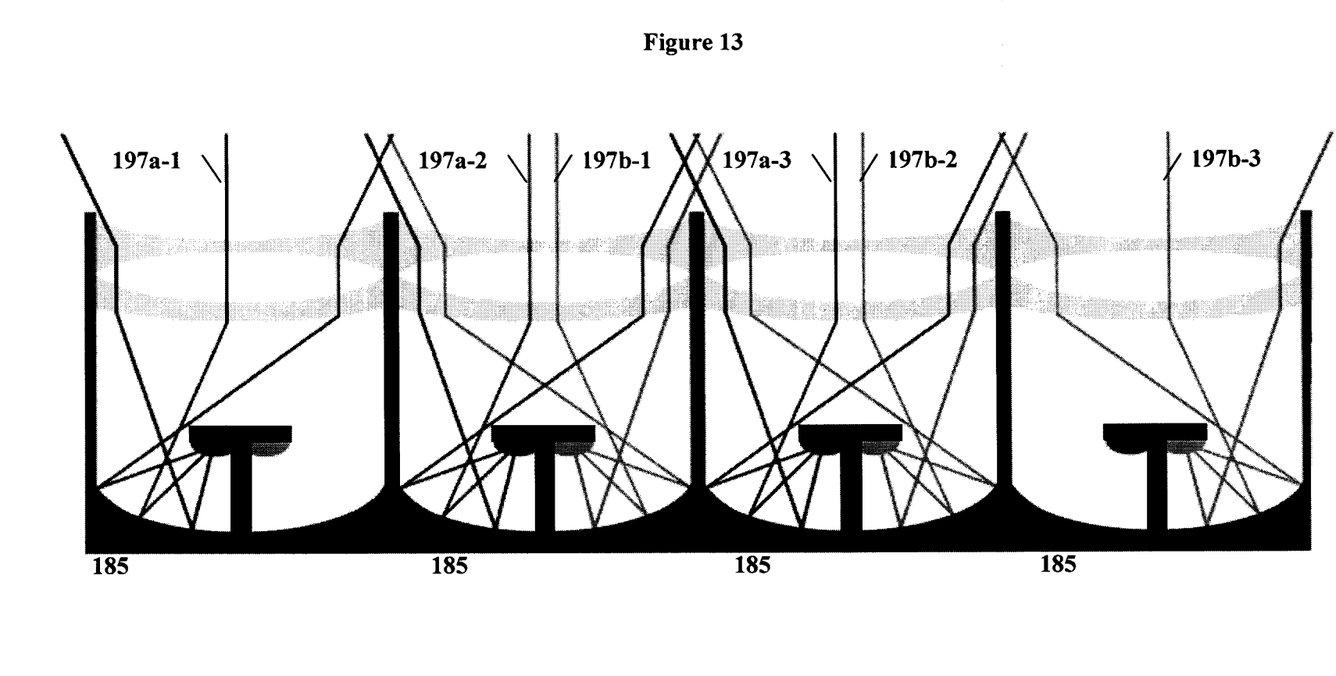

FIG. 12 shows an array of receptive 3D-RML assemblies 185 for receiving incoming light rays, 197a-1, 197b-1, 197a-2, 197b-2, 197a-3, 197b-3, 197a-4, and 197b-4. However, depending on the resolution of the images required to capture or to enhance or improve quality of capturing three-dimensional images, a processing technique (optically, digitally or both optically and digitally) may be used. FIG. 13 shows one of such techniques to create a larger degree of separation between left (197a-1, 197a-2, 197a-3) and right incoming rays (197b-1, 197b-2, 197b-3). In particular, incoming light rays, including left (197a-1, 197a-2, 197a-3) and right incoming rays (197b-1, 197b-2, 197b-3), are optically separated to create an improved three-dimensional visual effect. Slight loss of image resolution may be resulted in this particular example, such processing creates matched sets spanning across multiple receptive 3D-RML assemblies 185.

Figure 10:
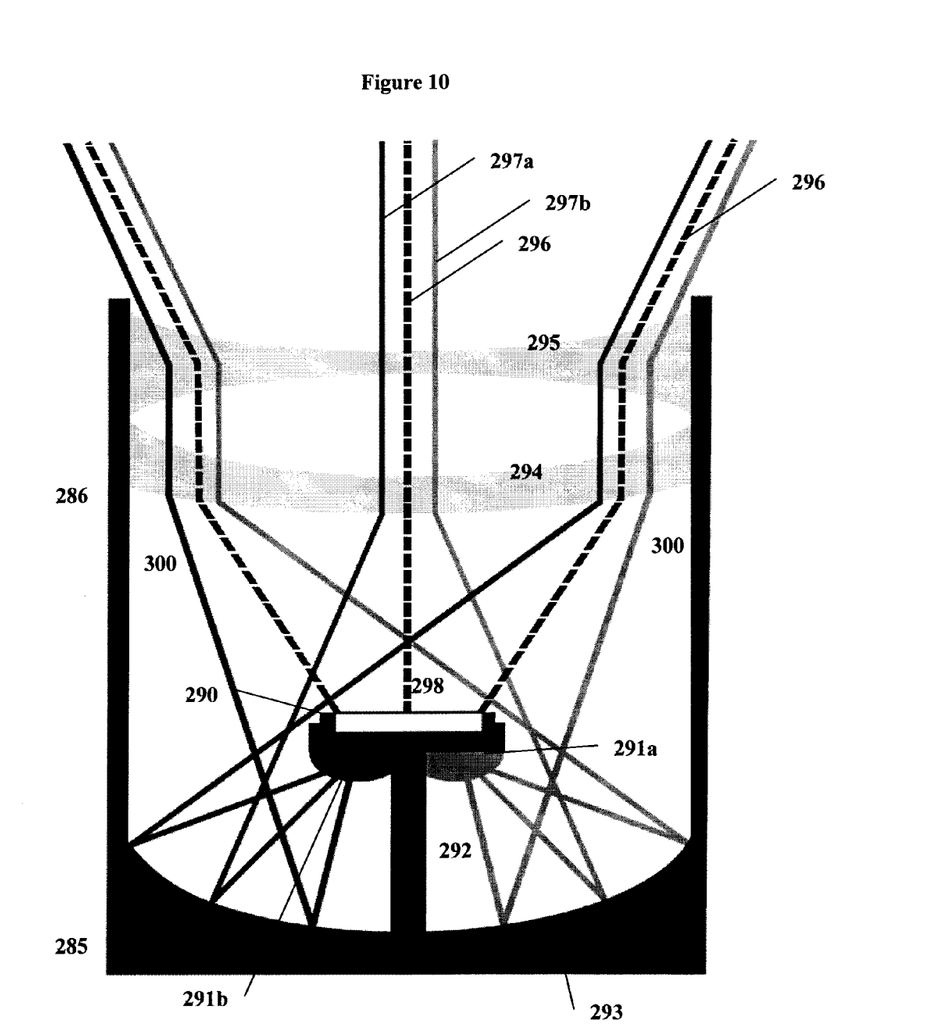
FIG. 10 illustrates a compound three-dimensional reflex micro lens assembly of the present invention.

Yet other embodiment of the present invention, it provides a compound reflex mirror lens assembly 285 as shown in FIG. 10. The compound reflex mirror lens assembly 285 combines the projective 3D-RML assembly structure similar to the ones shown in FIGS. 5 and 6 with a front facing photodiode 298 on a parallax assembly 290. For example, the compound reflex lens assembly 285 comprises a housing 286 having lateral walls 300, the optical projection and reception assembly 290, include a parallax barrier 292 extends from the reflex mirror assembly 293. A right 291a and left eye diode 291b are situated at the top of the parallax barrier 292, and the front facing photodiode 298 is placed at the top thereof such that only the incoming light rays 296 is directed to the photodiode 298, while the light rays emitted from the right 291a and left eye diode 291b are directed out to the corresponding viewer's eyes, 297a and 297b. In other words, the front facing photodiode 298 allows for incoming light to be recorded while light is emitted and projected out through the compound 3D-RML assembly 285. This would allow for the recording of content in front of, for example, the screen while separate imagery is being projected. This may be suitable for computer users as the display screen works as a web camera or alike, allowing the viewer to look directly toward the image on the screen. Subject tracking may also be incorporated into the application such that commands based on the motions or/and gestures of the user may be used to control the device and its functionalities.

Figure 11:
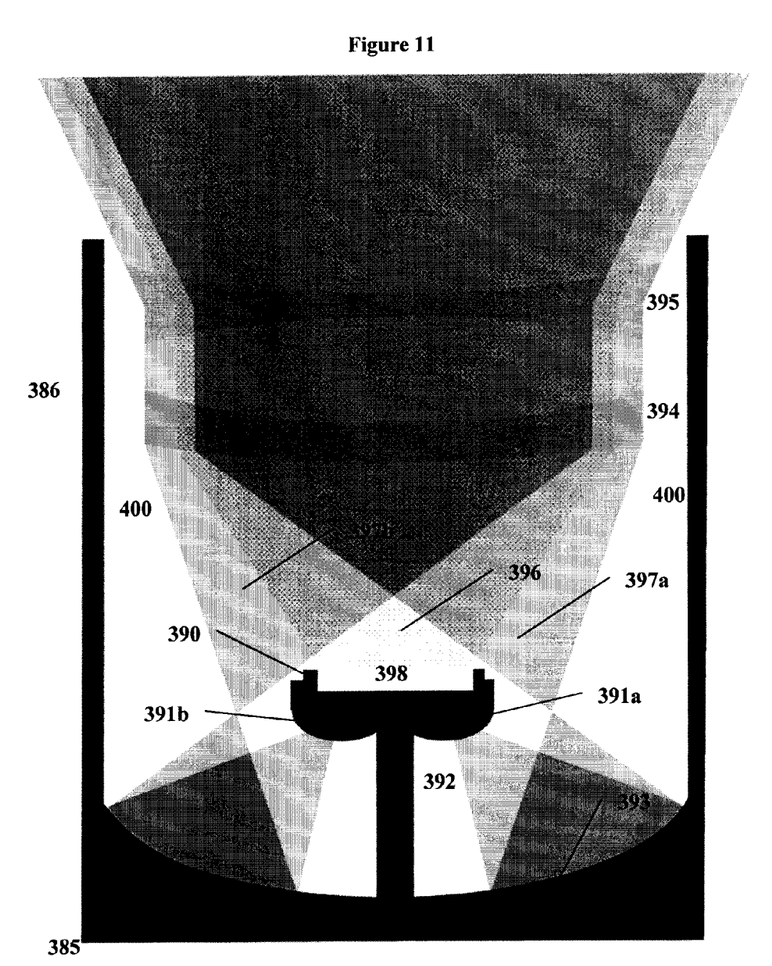
FIG. 11 illustrates another compound three-dimensional reflex micro lens assembly of the present invention.

Yet another embodiment of the present invention provides a 2D variant of the compound 3-D RML assembly 385 as shown in FIG. 11, which produces two-dimensional image while capturing three-dimensional images. This compound 3-D RML assembly 385 is based on the receptive 3-D RML assembly 185 as shown in FIG. 9. For example, the compound 3-D RML assembly 385 comprises the optical projection and reception assembly 390. The optical projection and reception assembly comprises a right 391a and left eye photodiode 391b on the top portion of the parallax barrier 392 that extends from the flex mirror assembly 393. A front facing diode 398 is situated on the top of the right 391a and left eye photodiode 391b. The front facing diode 398 emits and displays two-dimensional image 396 to the viewer's eyes while the right 391a and left eye photodiode 391b receive light rays 397a and 397b, respectively, for capturing three dimensional images.

It is to be understood that the embodiments and variations shown and described herein are merely illustrations of the principles of this invention and that various modifications may be implemented by those skilled in the art without departing from the spirit and scope of the invention.

The invention claimed is:

1. An apparatus for displaying a three dimensional image, comprising a matrix of pixels, each pixel comprising:
   a. a housing having a base structure and lateral walls surrounding the base structure, the lateral walls defining an open end opposing to the base structure;
   b. a reflex mirror assembly at the base structure;
   c. a dual diode projecting assembly having:
      i. a parallax barrier extending from about the center of the reflex mirror assembly, and dividing the reflex mirror assembly into two portions; and
      ii. at least two light emitting diodes affixed to the parallax barrier away from the reflex mirror assembly, and each of the at least two light emitting diodes projects emitted lights to the corresponding one of the two portions of the reflex mirror assembly;
   d. a lens assembly at the open end of the housing that receives, corrects and redirects the reflected light rays from the reflex mirror assembly.

2. The apparatus as recited in claim 1 wherein the lens assembly comprises a first lens assembly that corrects the directions of the reflected light rays, and second lens assembly that receives and directs the corrected light rays from the first lens assembly.

3. An apparatus for capturing a three dimensional image, comprising a matrix of pixels, each pixel comprising:
   a. a housing having a base structure and lateral walls surrounding the base structure, the lateral walls defining an open end opposing to the base structure;
   b. at least one lens assembly at the open end of the housing that receives and redirects the incoming light rays;
   c. a reflex mirror assembly at the base structure for reflecting the corrected incoming light rays through the at least one lens assembly; and
   d. a dual photodiode reception assembly having:
      i. a parallax barrier extending from about the center of the reflex mirror assembly, and dividing the reflex mirror assembly into two portions; and
      ii. at least two photodiodes affixed to the parallax barrier away from the reflex mirror assembly, and each of the at least two photodiodes receives the reflected light rays from the corresponding one of the two portions of the reflex mirror assembly.

4. The apparatus as recited in claim 3 further comprises means for optically, digitally or optically and digitally further separating the incoming light rays into left and right light rays.

5. The apparatus as recited in claim 3, further comprising an array of receptive assemblies or a secondary lens assembly for optically, digitally or optically and digitally further separating the incoming light rays into left and right light rays.

6. The apparatus as recited in claim 5, wherein the array of receptive assemblies is an array of receptive 3D-RML assemblies.

7. An apparatus for capturing a three dimensional image while displaying a two dimensional image, comprising a matrix of pixels, each pixel comprising:
   a. a housing having a base structure and lateral walls surrounding the base structure, the lateral walls defining an open end opposing to the base structure;
   b. at least one lens assembly at the open end of the housing that corrects the directions of the incoming light rays;
   c. a reflex mirror assembly at the base structure for reflecting the corrected incoming light rays through the at least one lens assembly; and
   d. a dual photodiode reception assembly having:
      i. a parallax barrier extending from about the center of the reflex mirror assembly, and dividing the reflex mirror assembly into two portions;
      ii. at least two photodiodes affixed to the parallax barrier away from the reflex mirror assembly, and each of the at least two photodiodes receives reflected light rays from the corresponding one of the two portions of the reflex mirror assembly; and
      iii. at least one light emitting diodes facing to the open end of the housing that emit light rays out directly through the at least one lens assembly.

8. An apparatus for capturing a two dimensional image while displaying a three dimensional image, comprising a matrix of pixels, each pixel comprising:
   a. a housing having a base structure and lateral walls surrounding the base structure, the lateral walls defining an open end opposing to the base structure;
   b. a reflex mirror assembly at the base structure;
   c. a dual diode projecting assembly having:
      i. a parallax barrier extending from about the center of the reflex mirror assembly, and dividing the reflex mirror assembly into two portions;
      ii. at least two light emitting diodes affixed to the parallax barrier away from the reflex mirror assembly, and each of the two light emitting diodes projects emitted lights to the corresponding one of the two portions of the reflex mirror assembly; and iii. a photodiode facing to the open end of the housing;
d. a first lens assembly at the open end of the housing that corrects the directions of the reflected light rays emitted from the at least two light emitting diodes; and
e. a secondary lens assembly at the open end of the housing a sufficient space away from the first lens assembly that receives and redirects the light rays corrected by the first lens assembly;
wherein the directions of incoming light rays are corrected first at the secondary lens and redirected at the first lens assembly to the photodiode.

* * * * *